(12) United States Patent
Curry et al.

(10) Patent No.: US 8,285,636 B2
(45) Date of Patent: Oct. 9, 2012

(54) METHODS OF MONITORING BEHAVIOR/ACTIVITY OF AN INDIVIDUAL ASSOCIATED WITH AN ORGANIZATION

(76) Inventors: Edith L. Curry, Glen Allen, VA (US); Frank Hailstones, Orlando, FL (US); Michael A. Dement, Williamsburg, VA (US); Laurie S. Holtz, Miami Beach, FL (US)

( * ) Notice: Subject to any disclaimer, the term of this patent is extended or adjusted under 35 U.S.C. 154(b) by 644 days.

(21) Appl. No.: 11/463,678

(22) Filed: Aug. 10, 2006

(65) Prior Publication Data

US 2008/0015978 A1    Jan. 17, 2008

Related U.S. Application Data

(63) Continuation-in-part of application No. 11/424,086, filed on Jun. 14, 2006.

(51) Int. Cl.
*G06Q 40/00* (2012.01)
(52) U.S. Cl. ........................................................ 705/38
(58) Field of Classification Search ............... 705/35–45
See application file for complete search history.

(56) References Cited

U.S. PATENT DOCUMENTS

| | | | |
|---|---|---|---|
| 5,754,938 A | 5/1998 | Herz et al. | |
| 6,112,181 A | 8/2000 | Shear et al. | |
| 6,119,103 A * | 9/2000 | Basch et al. | 705/35 |
| 6,519,571 B1 | 2/2003 | Guheen et al. | |
| 6,823,068 B1 | 11/2004 | Samid | |
| 6,938,021 B2 | 8/2005 | Shear et al. | |
| 6,990,454 B2 | 1/2006 | McIntosh | |
| 7,346,575 B1 * | 3/2008 | Ahles et al. | 705/38 |
| 7,447,650 B1 * | 11/2008 | Gutierrez et al. | 705/35 |
| 7,454,375 B1 * | 11/2008 | Gutierrez et al. | 705/35 |
| 7,505,933 B1 * | 3/2009 | Gutierrez et al. | 705/35 |
| 7,672,884 B2 * | 3/2010 | Schuster et al. | 705/35 |
| 7,720,751 B2 * | 5/2010 | Bongiorno et al. | 705/38 |
| 7,937,319 B2 * | 5/2011 | Kennis et al. | 705/38 |
| 7,941,353 B2 * | 5/2011 | King et al. | 705/35 |
| 2001/0011255 A1 * | 8/2001 | Asay et al. | 705/76 |

(Continued)

OTHER PUBLICATIONS

"Full Exposure../New financial disclosure requirements will test will of business people to serve on appointive boards", Nov. 24, 2004, p. 8, Houston Chronicle.*

(Continued)

*Primary Examiner* — Ella Colbert
*Assistant Examiner* — Mohammad Z Shaikh
(74) *Attorney, Agent, or Firm* — Hahn Loeser & Parks LLP (57) ABSTRACT

A cooperative arrangement and method to monitor behaviors and other activities by an individual in an organization are disclosed. A personal financial disclosure statement, personal financial records, and other relevant financial data associated with an individual who is associated with, or to be associated with, the organization are obtained. Information is extracted from the personal financial disclosure statement, the personal financial records, and the other relevant financial data and input into a risk assessment algorithm. The risk assessment algorithm operates on the input information and generates risk assessment data. The risk assessment data is evaluated to make a determination of certification with respect to the individual. A decision to certify means that the risk associated with the individual, with respect to committing fraud or some other improper act with respect to the organization, is acceptable. Risk assessment data on a plurality of key individuals within the organization may be generated and evaluated to make a determination of certification with respect to the organization as a whole.

25 Claims, 4 Drawing Sheets

U.S. PATENT DOCUMENTS

| | | | |
|---|---|---|---|
| 2001/0031451 A1* | 10/2001 | Sander et al. | 434/236 |
| 2002/0032627 A1 | 3/2002 | Perot et al. | |
| 2003/0037063 A1 | 2/2003 | Schwartz | |
| 2003/0233278 A1 | 12/2003 | Marshall | |
| 2004/0006533 A1 | 1/2004 | Lawrence | |
| 2004/0019500 A1 | 1/2004 | Ruth | |
| 2004/0068431 A1 | 4/2004 | Smith et al. | |
| 2004/0083220 A1* | 4/2004 | Moro et al. | 707/100 |
| 2004/0128186 A1 | 7/2004 | Breslin et al. | |
| 2004/0158521 A1 | 8/2004 | Newton et al. | |
| 2004/0181665 A1 | 9/2004 | Houser | |
| 2004/0260634 A1* | 12/2004 | King et al. | 705/35 |
| 2004/0267660 A1 | 12/2004 | Greenwood et al. | |
| 2005/0015622 A1 | 1/2005 | Williams et al. | |
| 2005/0031120 A1 | 2/2005 | Samid | |
| 2005/0033628 A1* | 2/2005 | Alverson et al. | 705/10 |
| 2005/0044037 A1 | 2/2005 | Lawrence et al. | |
| 2005/0055308 A1 | 3/2005 | Meyer et al. | |
| 2005/0065807 A1 | 3/2005 | DeAngelis et al. | |
| 2005/0065839 A1* | 3/2005 | Benson et al. | 705/10 |
| 2005/0065904 A1 | 3/2005 | DeAngelis et al. | |
| 2005/0065941 A1 | 3/2005 | DeAngelis et al. | |
| 2005/0131830 A1 | 6/2005 | Juarez et al. | |
| 2005/0144135 A1 | 6/2005 | Juarez et al. | |
| 2005/0149527 A1 | 7/2005 | Berlin et al. | |
| 2005/0182722 A1 | 8/2005 | Meyer et al. | |
| 2005/0197952 A1* | 9/2005 | Shea et al. | 705/38 |
| 2005/0203792 A1 | 9/2005 | Kuppe et al. | |
| 2005/0209876 A1* | 9/2005 | Kennis et al. | 705/1 |
| 2005/0209899 A1* | 9/2005 | King et al. | 705/8 |
| 2005/0216385 A1 | 9/2005 | Schneider | |
| 2005/0228685 A1 | 10/2005 | Schuster et al. | |
| 2005/0257267 A1 | 11/2005 | Williams et al. | |
| 2005/0273430 A1 | 12/2005 | Pliha | |
| 2006/0002387 A1 | 1/2006 | Lawrence et al. | |
| 2006/0004581 A1 | 1/2006 | Claudatos et al. | |
| 2006/0004719 A1 | 1/2006 | Lawrence et al. | |
| 2006/0004818 A1 | 1/2006 | Claudatos et al. | |
| 2006/0004819 A1 | 1/2006 | Claudatos et al. | |
| 2006/0004847 A1 | 1/2006 | Claudatos et al. | |
| 2006/0004868 A1 | 1/2006 | Claudatos et al. | |
| 2006/0010047 A1 | 1/2006 | Minor | |
| 2006/0015764 A1 | 1/2006 | Ocko et al. | |
| 2006/0047561 A1* | 3/2006 | Bolton | 705/10 |
| 2006/0059073 A1 | 3/2006 | Walzak | |
| 2006/0069685 A1 | 3/2006 | Dickens et al. | |
| 2006/0218407 A1* | 9/2006 | Toms | 713/182 |
| 2007/0055596 A1* | 3/2007 | Yankovich et al. | 705/35 |
| 2007/0112667 A1* | 5/2007 | Rucker | 705/38 |
| 2007/0244782 A1* | 10/2007 | Chimento | 705/35 |
| 2007/0288355 A1* | 12/2007 | Roland et al. | 705/38 |
| 2008/0015977 A1* | 1/2008 | Curry et al. | 705/38 |
| 2008/0086342 A1* | 4/2008 | Curry et al. | 705/7 |

OTHER PUBLICATIONS

"Full exposure . . . /New financial disclosure requirements will test will of business people to serve on appointive boards", Houston Chronicle, Nov. 24, 2004, p. 8.*

Deloitte & Touche Launches DTect(SM) Financial Fraud Investigation Service, PR Newswire. New York: Aug. 26 2004. pp. 1-3.*

"Full Exposure../New Financial disclosure reuirements will test will of business people to serve on appointive boards", Houston Chronicle. Houtson, Tex: Nov. 24, 2004. p. 8.*

"Compli Announces Version 3 of Compliance Management System With Expanded Assistance for Sarbanes-Oxley", Business Wire. New York: Feb. 25, 2004. p. 1.*

"Deloitte & Touche Launces DTect(SM) Financial Fraud Investigation Service", PR Newswire. New Y ork: Aug. 26, 2004. p. 1.*

Anonymous, "How HRIS can help with SOX Compliance", HR Focus, Oct. 2005, v82, n10, pp. 7,10.*

Falcone, Paul, "Reporting for SOX Duty", HRMagazine, v 51, n6, pp. 161-162, 164,166, 168.*

"IBS America Unveils Seamless Framework to Help Organizations Foster a Culture of Compliance; New Web-based CompliantPro Solution Prvoides First Integrated, Flexible Platfom to Address Increasingly Complex Regulatory and Quality Mandates", Business Wire, Dec. 12, 2005, pp. 1-2.*

Kingston, Andrea, "Software for Sarbanes-Oxley Compliance: An Overview for 2006", Internal Auditing, v21 n1, pp. 12-17.*

"McGraw-Hill Professional Releases Sarbanes-Oxley Risk and Control Training An Online Course for Financial Compliance", PR Newswire. New York: Jul. 24, 2003, p. 1.*

"Technology Solutions Company Guides QuadraMed Implementation to Automate Sarbanes-Oxley Compliance", PR Newswire. New York: Feb. 10, 2005, p. 1.*

"Vignette Launches Business Unit and Solutions for Enterprise Learning; Vignette Enterprise Learning Helps Organizations Meet Compliance and Regulatory Requirements", Business Wire. New York: Sep. 26, 2005, p. 1.*

* cited by examiner

METHODS OF MONITORING BEHAVIOR/ACTIVITY OF AN INDIVIDUAL ASSOCIATED WITH AN ORGANIZATION

CROSS-REFERENCE TO RELATED APPLICATIONS/INCORPORATION BY REFERENCE

This U.S. patent application is a continuation-in-part (CIP) of pending U.S. patent application Ser. No. 11/424,086, filed on Jun. 14, 2006.

TECHNICAL FIELD

Certain embodiments of the present invention relate to organizational behavior such as, for example, behavior of an individual when operating within a legal entity such as a corporation. More particularly, certain embodiments of the present invention relate to methods of deterring fraud and other improper behaviors of individuals associated with an organization by reducing the risks of financial self-dealing and self-enrichment associated with the people who are responsible for various aspects of the organization.

BACKGROUND OF THE INVENTION

Corporate fraud is perpetrated by individuals, and a leading fraud indicator is the individual's personal financial behaviors. How an individual earns, saves, invests, manages, and spends money are key factors. Typically, fraud and embezzlement begins with the individual telling himself, " . . . just this once, I'll pay it back." But once that line is crossed, the individual rarely turns back. It becomes easier and easier, with the amount embezzled steadily increasing before being detected, if at all.

The core of the problem is a breach of fiduciary duty by the trustees of the investors' interests (i.e., the board of directors and management). A passive, non-independent, and rubber-stamping board of directors made up of members selected by the CEO or chairman of the board is not a guarantee of effective oversight of management actions and conduct.

However, management teams that place personal interests above investor demand for value creation when conducting the affairs of the corporation incur a systemic conflict of interest. In the past, breaches of fiduciary duty by management and boards of directors were sometimes condoned by auditors who lacked independence and possessed limited capability and authority to challenge management.

The Sarbanes-Oxley Act (SOA), signed into law on Jul. 30, 2002 was designed to protect America's shareholders and workers and gave the Federal Government new powers to enforce corporate responsibility and to improve oversight of corporate America. This legislation gave new power to prosecutors and regulators seeking to improve corporate responsibility and protect America's shareholders and workers. Among other reforms, the legislation:

created a new accounting oversight board to police the practices of the accounting profession;
strengthened auditor independence rules;
increased the accountability of officers and directors;
enhanced the timeliness and quality of financial reports of public companies;
barred insiders from selling stock during blackout periods when workers are unable to change their 401(K) plans;
created a new securities fraud provision with a 25-year maximum term of imprisonment;
directed the Sentencing Commission to review sentencing in white collar crime, obstruction of justice, securities, accounting, and pension fraud cases;
required CEOs and Chief Financial Officers (CFOs) to personally certify that financial reports submitted to the SEC fully comply with the securities laws and fairly present, in all material respects, the financial condition of the company;
made it a crime to willfully certify any such financial report knowing the same to be false or non-compliant, punishable by up to 20-years in prison;
criminalized the alteration or falsification of any document with the intent to obstruct the investigation of any matter within the jurisdiction of a United States Department or Agency;
criminalized retaliatory conduct directed at corporate whistleblowers and others; and
required that audit papers be retained for five years and criminalized the failure to maintain such records.

The Sarbanes-Oxley Act places considerable emphasis on correcting lax corporate governance practices, including:

management dealing in an environment full of pervasive conflicts of interest;
lack of strict transparency, reliability, and accuracy standards in financial reporting;
lack of independence between the key players in corporate governance, beginning with the board of directors, senior management, and auditors;
lack of adequate enforcement tools for regulators; and
widespread conflicts of interest influencing securities market transactions.

Addressing the systemic weakness of the corporate governance practices in the post-Sarbanes-Oxley corporate environment requires more than correcting the most visible manifestations of the problem. Weak governance practices are the combined result of several offenders and lax controls over the performance of both management and the board of directors.

Laws and regulations have never been sufficient to guarantee society's welfare or, in this case, improvement in corporate governance standards. In many ways, Sarbanes-Oxley has merely made express the duties and responsibilities of boards, CEOs, and CFOs and taken away from them the ability to point a finger at someone else if fraud and abuse occur at a company covered by Sarbanes-Oxley. However, these duties existed before Sarbanes-Oxley was enacted albeit in less explicit fashion. While it may be comforting to some that Sarbanes-Oxley has eliminated the ability of senior management to claim they did not know or were not aware, this is still unlikely to prevent people from committing the types of fraud and abuse that led to the passage of Sarbanes-Oxley in the first place.

While Sarbanes-Oxley, in its current or future form, will play a necessary role in ensuring that U.S. companies avoid certain excesses, the market and investors should continue to seek out solutions that are driven by market needs that help restore and maintain the confidence of investors in public companies.

Accountability is the key. The owners of America's corporations (i.e., the stockholders) must hold managers, directors, auditors, and market participants accountable. The performance of these groups directly impacts shareholder value. The corporate governance process must be re-engineered into one that guarantees performance excellence by management and the board of directors when performing their agency duties as trustees of shareholder confidence.

Although implementing corporate governance best practices can result in additional operating costs, good corporate governance is not an option but an obligation, if shareholder interest is to be protected. Compliance costs are only a small fraction of the large losses suffered by stockholders because the board and/or executive management did not comply with good corporate governance practices. Sarbanes-Oxley has taken great steps at ensuring proper corporate governance and has put some teeth into board and management penalties for non-compliance.

Sarbanes-Oxley, in its present form, is a good first step in combating abuses. However, additional protections should be put in place which complement Sarbanes-Oxely by more directly addressing those problems which Sarbanes-Oxley, by itself, cannot solve such as, for example, fraud prevention.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY OF THE INVENTION

A first embodiment of the present invention comprises a method to monitor the behavior/activity of an individual associated with an organization. The method includes obtaining a personal financial disclosure statement of an individual person associated with or potentially to be associated with the organization and also obtaining personal financial records and other relevant financial data of the individual person. The method further includes inputting first information from the personal financial disclosure statement, the personal financial records, and the other relevant financial data into a risk assessment algorithm. The method also includes the risk assessment algorithm operating on the first input information and thereby generating first risk assessment data. The method further includes evaluating the first risk assessment data and thereby making a first determination of certification with respect to the individual person.

A second embodiment of the present invention comprises a method to monitor the behavior/activity of individuals associated with an organization. The method comprises obtaining a personal financial disclosure statement, personal financial records, and other relevant financial data for each of a plurality of individual persons associated with the organization. The method further comprises inputting first information from each of the personal financial disclosure statements, each of the personal financial records, and each of the other relevant financial data into a risk assessment algorithm. The method also comprises the risk assessment algorithm operating on the first input information and thereby generating first risk assessment data. The method further comprises evaluating the first risk assessment data and thereby making a first determination of certification with respect to the organization.

A third embodiment of the present invention comprises a method to monitor an individual person of an organization for behavioral risk. The method includes periodically obtaining updated personal financial records and other relevant financial data of an individual person that is currently certified for risk with respect to the organization. The method further includes inputting, into a risk assessment algorithm, updated information from the updated personal financial records and other relevant financial data along with previous information from a previously obtained personal financial disclosure statement of the individual person. The method also includes the risk assessment algorithm operating on the input information and thereby generating updated risk assessment data. The method further includes evaluating the updated risk assessment data and thereby making an updated determination of certification with respect to the individual person.

All individuals who are in a position of materially affecting the financial performance or assets of an organization can apply for certification, in accordance with an embodiment of the present invention. The individual completes a financial disclosure statement and gives the certifying entity permission to review their past and/or present financial behaviors for, for example, the past 5 to 10 years depending on position (s) held. If the employee meets the risk criteria, they are certified. Such a certification process helps to drive the right behaviors of individuals.

If, at any time during the certification period, issues of concern are identified, the corresponding event is investigated for accuracy and, depending on the results of the investigation, certification may be suspended, cancelled, re-rated, or left unchanged. The certification entity, in accordance with an embodiment of the present invention, is an evaluator of risk (preferably an independent evaluator of risk, but possibly a self-policing evaluator of risk). The oversight and independent monitoring of key individuals are provided, thus identifying those most likely to be a fraud risk. Certain embodiments of the present invention use risk models which are based on a complex algorithm of predictive financial modeling, and not on biographical data which could be used for profiling.

These and other advantages and novel features of the present invention, as well as details of illustrated embodiments thereof, will be more fully understood from the following description and drawings.

DETAILED DESCRIPTION OF THE INVENTION

As used herein, the term "organization" generally refers to a publicly-held corporation, a non-publicly held corporation, a private business, a for-profit business, a not-for-profit entity, a government entity, an athletic organization, or any other type of organization where it may be desirable to implement embodiments of the present invention. As used herein, the term "agent" refers to any individual person in a position of responsibility and/or trust with respect to an organization, including but not limited to an officer of the organization, an employee of the organization, a member of the board of directors of an organization, a major stockholder of the organization, an athlete, and anyone who has the ability to override governance, policies, procedures, and controls of the organization if they exist, or who has the ability to over-ride public laws or good practices. As used herein, the term "risk" generally refers to the risk associated with the likelihood of an agent to commit fraud or some other improper act with respect to the organization. As used herein, the term "independent" means not associated with another entity in terms of ownership or control.

Figure 1:
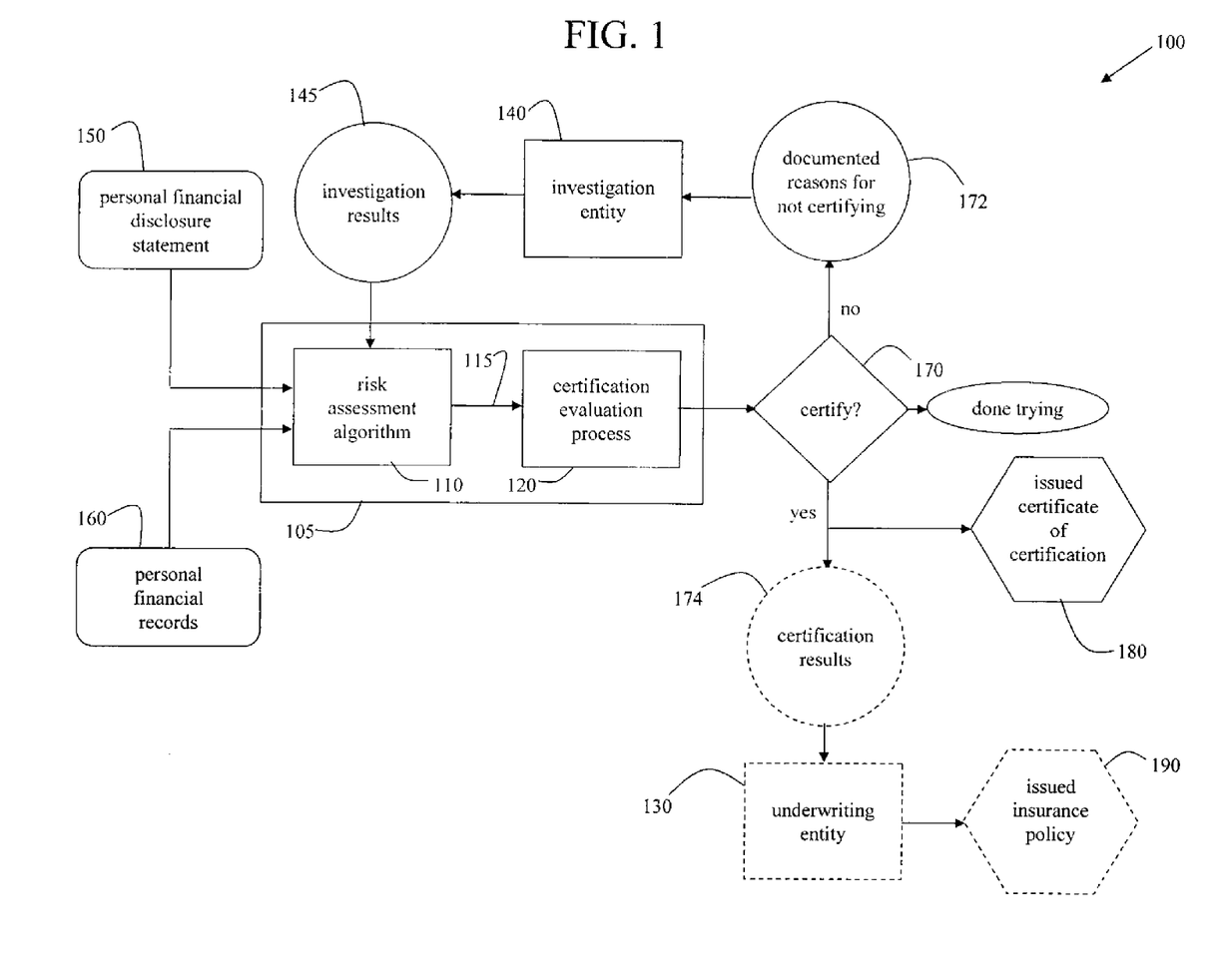
FIG. 1 is a functional block diagram of an embodiment of a cooperative arrangement to monitor the behavior/activity of an individual associated with an organization, in accordance with various aspects of the present invention.

FIG. 1 is a functional block diagram of an embodiment of a cooperative arrangement 100 to monitor the behavior/activity of an individual associated with an organization, in accordance with various aspects of the present invention. The cooperative arrangement 100 comprises a certification entity 105 which includes a risk assessment algorithm 110 and a certification evaluation process 120. The cooperative arrangement 100 further comprises an underwriting entity 130, as an option, and an investigation entity 140. The risk assessment algorithm 110 is adapted to accept information from at least one personal financial disclosure statement 150 and at least one set of personal financial records 160 and other relevant financial data. Each personal financial disclosure statement 150 and each set of personal financial records 160 and other relevant financial data is associated with one individual person (e.g., an agent of the organization). In accordance with certain embodiments of the present invention, the agent has the choice to proceed or not with the certification process. That is, the agent may or may not give his informed consent to engage in the certifying process and may or may not give permissive use of his financial records and data.

In accordance with an embodiment of the present invention, the certifying entity 105 is preferably, but not necessarily, independent of both the individual persons to be certified and the organization. The risk assessment algorithm 110 operates on the input information from the personal financial disclosure statement(s) 150 and the set(s) of personal financial records 160 and other relevant financial data and generates risk assessment data 115. The risk that is being assessed is the likelihood that an individual person (i.e., agent) will attempt to commit fraud or other improper actions against the organization. The risk assessment data 115 is input to the certification evaluation process 120. The certification evaluation process 120 evaluates the risk assessment data 115 to make a determination of certification 170 with respect to one of an individual person (e.g., an agent of the organization) or to the organization itself.

If the determination of certification 170 is "yes" (i.e., to certify), then a record of certification 180 is created (i.e., the paperwork, record, or computer file verifying that the person is certified), for the individual person or the organization. This may or may not take the form of issuing a certificate of certification. As an option, the underwriting entity 130 is used to conduct an underwriting procedure. That is, the underwriting entity 130 is used to generate and issue, or update, an insurance policy or fidelity bonding policy 190 in response to the certification results 174 of the evaluation process 120. For example, the certified agent may be added to the policy. In general, however, the underwriting entity 130 will typically make its own independent evaluation and may or may not use the certification results 174 in determining underwriting status (i.e., the underwriting entity is not bound by the certification results).

When the decision is "to certify", the certification entity 105 is saying that the risk associated with the agent, with respect to committing fraud or some other improper act with respect to the organization, is acceptable. If the determination of certification 170 is "no" (i.e., not to certify), then documented reasons for not certifying 172 are generated and forwarded to the investigation entity 140.

In accordance with an embodiment of the present invention, the investigation entity 140 performs an investigation based on the documented reasons for not certifying 172 and generates a set of investigative results 145. Information from the investigative results 145 may be input back into the risk assessment algorithm 110, along with the personal financial disclosure statement 150 and the set of personal financial records 160 and other relevant financial data to generate a second set of risk assessment data 115 (i.e., investigation-based risk assessment data). As part of the investigation, the investigative entity 140 may ask for additional information from the agent to be certified, or may wish to interview the agent to be certified.

The second risk assessment data 115 is input to the certification evaluation process 120. The certification evaluation process 120 evaluates the second risk assessment data 115 to make a new investigated determination of certification 170 with respect to one of an individual person (e.g., an agent of the organization) or the organization itself. Based on the additional information from the investigative results 145, the second risk assessment data 115 and, therefore, the new determination of certification 170 may be the same as (i.e., "no") or different from (i.e., "yes") the original determination of certification 170. As a practical matter, there may be a limit to the number of times that a result of "no" or "do not certify" will be investigated. That is, at some point, the attempts to certify the agent will be stopped.

In accordance with an alternative embodiment of the present invention, financial records and other relevant financial data of other persons associated with the agent to be certified may be obtained and input into the risk assessment algorithm 110 along with the information from the agent to be certified. Such other persons may include, for example, a spouse, a child, a sibling, a business partner, or a parent of the agent to be certified. Such information of other persons may be helpful if, for example, an unscrupulous individual were to try to hide embezzled funds in an account that is in the name of a close relative.

Figure 2:
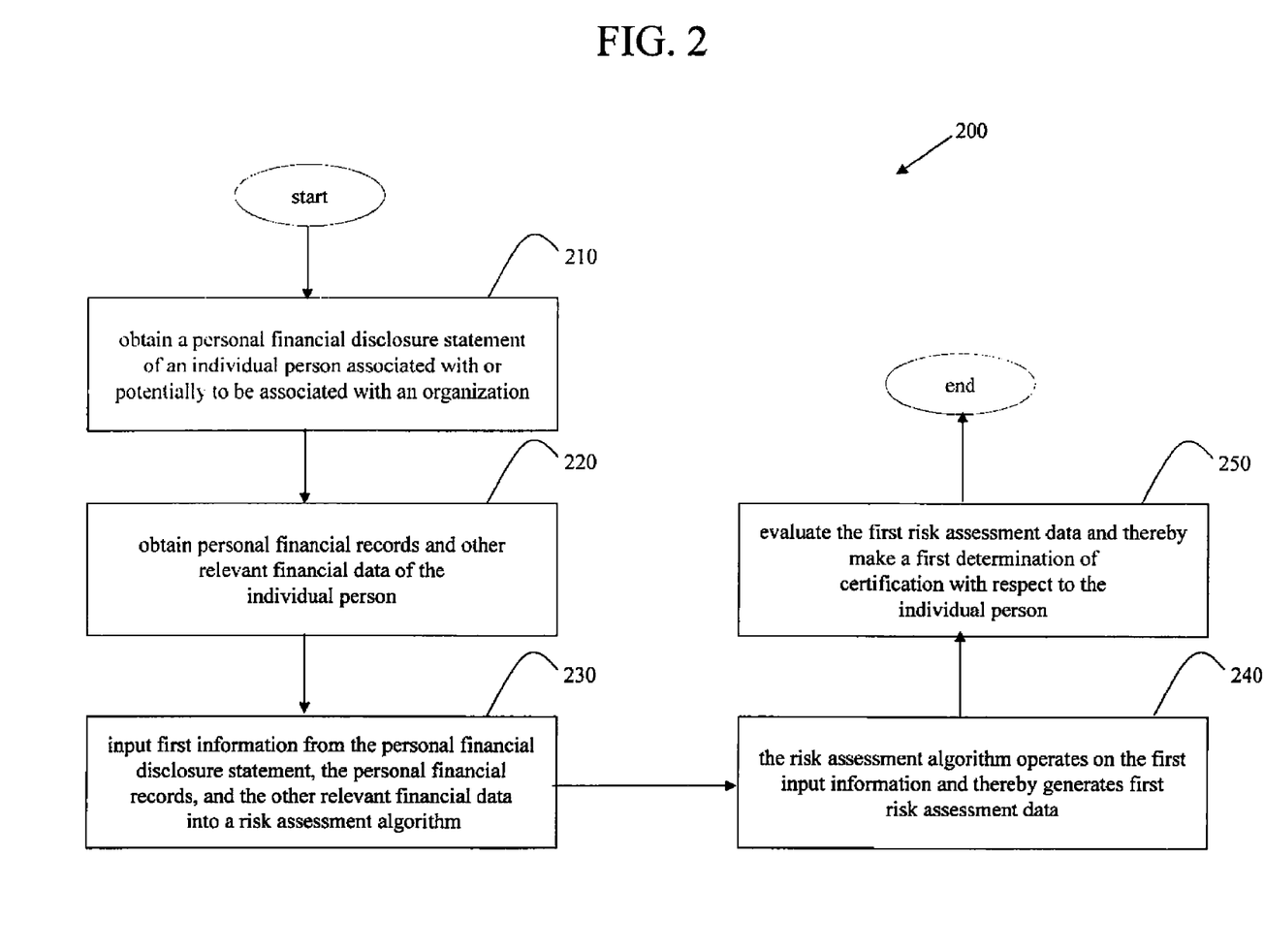
FIG. 2 illustrates a flowchart of a first embodiment of a method to monitor the behavior/activity of an individual associated with an organization using the cooperative arrangement of FIG. 1, in accordance with various aspects of the present invention.

FIG. 2 illustrates a flowchart of a first embodiment of a method 200 which may be performed (i.e., conducted) to monitor the behavior/activity of an individual associated with an organization using the cooperative arrangement 100 of FIG. 1, in accordance with various aspects of the present invention. In step 210, a personal financial disclosure statement of an individual person, associated with or potentially to be associated with an organization, is obtained. In step 220, personal financial records and other relevant financial data of the individual person are obtained. In accordance with an embodiment of the present invention, step 220 is performed only if the individual person gives permission. In step 230, first information from the personal financial disclosure statement, the personal financial records, and other relevant financial data is input into a risk assessment algorithm. In step 240, the risk assessment algorithm operates on the first input information and thereby generates first risk assessment data. In step 250, the first risk assessment data is evaluated to make a first determination of certification with respect to the individual person. In accordance with an alternative embodiment of the present invention, information from personal financial records and other relevant financial data are used. A personal financial disclosure statement is may not be obtained.

As an example, referring to FIG. 1, an agent of a corporation is to be certified for risk by the certification entity 105. In accordance with an embodiment of the present invention, the certification entity 105 is preferably, but not necessarily, an independent entity which is in the business of certifying individual agents of other organizations (e.g., publicly held corporations, non-publicly held corporations, government entities), for example. Such certification helps to ensure that the agent being certified is likely to comply with policies, procedures, rules, best practices, ethical and moral standards, and controls of the organization such as, for example, complying with Sarbanes-Oxley regulations. Such certification also helps to ensure that the agent being certified is likely to not engage in fraudulent activities such as, for example, embezzlement of funds, or other improper behaviors.

Continuing with the example, the agent registers with the certifying entity 105 and provides a personal financial disclosure statement 150 to the certification entity 105. Information provided on the personal financial disclosure statement may include, for example, information related to assets (e.g., home ownership), and liabilities (e.g., credit card debt) of the agent as well as income (e.g., a salary). The agent also gives permission to the certification entity 105 to obtain past and present personal financial records 160 and other relevant financial data such as, for example, tax return records, treasury records, real estate records, banking records, a credit report, and a Fair Isaac Company (FICO) score.

Information is extracted from the personal financial disclosure statement 150 and the personal financial records 160 and other relevant financial data and is input into the risk assessment algorithm 110. The risk assessment algorithm 110 operates on the input information and generates risk assessment data 115. The risk assessment data 115 may include, for example, detected discrepancies found when comparing the agent's personal financial disclosure statement 150 and the personal financial records 160. For example, an income discrepancy may be found. Also, evidence of irresponsible behavior may be detected (e.g., not paying minimum balances due on credit cards), evidence of suspicious behavior may be found (e.g., an unusual transfer of funds, a sudden move or change of residence), and an assessment of financial stability may be made (e.g., an assessment of "unstable" because the bank is about to foreclose on the agent's home). Other risk assessment data are possible as well, in accordance with various embodiments of the present invention. The weighting of these and other factors may vary by design.

Next, the risk assessment data 115 goes into the certification evaluation process 120. In accordance with an embodiment of the present invention, the risk assessment data 115 is operated on by the certification evaluation process 120 to generate a composite risk factor in response to the risk assessment data 115. The composite risk factor is a reliable indicator of the agent's level of risk with respect to fraudulent or other improper activity. In accordance with an embodiment of the present invention, the composite risk factor is a single numeric value or score. The composite risk factor is compared to a threshold value which is also a numeric value.

If the composite risk factor is greater than the threshold value, then a decision to "not certify" the agent is made. If the composite risk factor is less than the threshold value, then a decision to "certify" is made. In accordance with an alternative embodiment of the present invention, if the resultant composite risk factor is within a predefined range of values about the threshold value, a decision to "delay certification" is made and further action is taken to determine if the composite risk factor can be lowered (i.e., if the risk can be reduced) in order to subsequently make a decision to "certify". Other means of comparing a composite risk factor are possible as well, in accordance with various other embodiments of the present invention.

In accordance with an alternative embodiment of the present invention, the risk assessment algorithm 110 and the certification evaluation process 120 are implemented as a single algorithm or process. In accordance with an embodiment of the present invention, the risk assessment algorithm 110 and/or the certification evaluation process 120 are both implemented on a processor-based platform such as, for example, a personal computer (PC). In accordance with various embodiments of the present invention, the certification evaluation process 120 may be performed manually by a human, or may be performed automatically by a processor-based platform (e.g., a PC).

In the case where a decision to "certify" is made, certification results 174 may be generated and forwarded to the underwriting entity 130 as an option. In accordance with an embodiment of the present invention, the certification results 174 may include, for example, the resultant composite risk factor and the threshold value used, certain specified personal identification information of the certified agent and other certain financial information associated with the agent that were used to generate the composite risk factor. The underwriting entity 130 is typically an insurance company or a fidelity bonding entity, in accordance with certain embodiments of the present invention, and is preferably, but not necessarily, independent of the certification entity 105 and the investigation entity 140.

In accordance with an embodiment of the present invention, underwriting includes insuring the organization by accepting liability for designated losses arising from improper activities with respect to the organization by the agent. The underwriting entity 130 takes the certification results 174 and underwrites the organization by generating or adjusting an insurance policy or bonding policy having terms, conditions, and premium fees which are calculated in response to, at least in part, the certification results 174.

For example, if the certified agent's calculated composite risk factor is well below the threshold value, then the insurance premium fees that are to be paid for the insurance policy may be reduced or discounted from a standard rate of someone not having certification. Also, the terms and conditions of the insurance policy may be more favorable. For example, the amount of time that can pass before the agent is to be re-certified may be longer. Also, monitoring of the agent's future personal financial activities may be less frequent. In accordance with an embodiment of the present invention, the insurance premiums may be paid by the organization of the agent. As a result, the organization may be able to eliminate other forms of bonding and/or insurance coverage.

If new financial information is obtained for an agent and processed through the certification entity 105 and the resultant updated composite risk factor, based on the new information, is closer to the threshold value than a previously calculated composite risk factor, then the underwriting may be updated (i.e., premiums, terms and conditions may be re-calculated) as well based on the improved composite risk factor. Similarly, if the resultant updated composite risk factor is further away from the threshold, even better underwriting premiums, terms, and conditions may be provided.

In the case where a decision to not certify is made, documented reasons for not certifying 172 are forwarded to the investigation entity 140. In accordance with an embodiment of the present invention, the investigation entity 140 is a private agency or entity with expertise in investigating personal financial matters of individuals. The investigation entity 130 takes the documented reasons for not certifying 172 and determines the underlying circumstances involved and generates corresponding investigation results 145. In accordance with an alternative embodiment of the present invention, the investigation entity 140 is not independent of the certifying entity 105 and/or the organization. That is, self-policing may be performed.

For example, the agent's composite risk factor may be too high because the agent is seen to own shares of stock in a competing corporation which constitutes, at a minimum, a conflict of interest. Upon investigation, the investigative entity 140 determines that the shares of stock were purchased for the agent as a child by his father many years ago. The agent had forgotten about the shares of stock and, therefore, failed to disclose them on his personal financial disclosure statement 150. The investigative results 145 are then forwarded to the certifying entity 105 along with a recommendation that the agent sell the problematic shares of stock. Upon selling the shares of stock, information is extracted from the investigation results 145 and input into the risk assessment algorithm 110 along with the fact that the agent no longer owns the shares of stock, and along with the information previously extracted from the agent's personal financial disclosure statement 150, personal financial records 160 and other relevant financial data.

An updated set of risk assessment results 115 are generated and an updated composite risk factor, which is substantially lower than the original composite risk factor is generated. Upon comparing the updated composite risk factor to the threshold value, a determination to "certify" the agent is made. As a result, the agent becomes certified and the underwriting process may proceed if desired.

In accordance with an embodiment of the present invention, the risk assessment algorithm 110 takes the input information and generates a set of internal parameters. The risk assessment algorithm then applies weightings to the set of internal parameters and combines the weighted internal parameters in a particular way to generate the risk assessment results 115. Certain weighted internal parameters and/or combinations of weighted internal parameters may be applied to certain internal thresholds in a certain manner to generate particular risk assessment results 115 (e.g., binary risk assessment results).

In accordance with a further embodiment of the present invention, the risk assessment algorithm 110 is an evolutionary algorithm that can evolve over time as the risk assessment algorithm 110 is presented with new training input information along with truth output data corresponding to the input information. For example, information from a known first group of agents who have deliberately not complied with corporate governance rules and procedures and/or who are known to have committed fraud may be input into the risk assessment algorithm 110 along with the fact that these agents should not be certified (i.e., the algorithm should be able to adapt to generate risk assessment data 115 that detects a problem with this first group of agents with respect to risk). Similarly, information from a known second group of agents who have always complied with corporate governance rules and procedures and are known to have not committed fraud may be input into the risk assessment algorithm 110 along with the fact that these agents should be certified (i.e., the algorithm should be able to adapt to generate risk assessment data that does not detect a problem with this second group of agents with respect to risk).

Similarly, in accordance with a still further embodiment of the present invention, the certification evaluation process 120 is an evolutionary algorithm that can evolve over time as the certification evaluation process 120 is presented with new training risk assessment data 115 along with truth output data corresponding to the new risk assessment data 115. For example, when presented with the risk assessment data 115 corresponding to the known agents who deliberately did not comply with corporate governance rules and procedures and who committed fraud, the certification evaluation process 120 may adapt in order to correctly generate a "do not certify" output at the certification determination step 170. Such an adaptation may involve adapting the formula for calculating the composite risk factor and/or changing the threshold value. Similarly, when presented with the risk assessment data 115 corresponding to the known agents who always complied with corporate governance rules and procedures and did not commit fraud, the certification evaluation process 120 may adapt in order to correctly generate a "certify" output at the certification determination step 170.

Typically, the risk assessment algorithm 110, the certification evaluation process 120, and the certification determination step 170 are allowed to evolve simultaneously in order to take into account the truth data presented. Such evolutionary algorithms may be implemented as, for example, genetic algorithms and/or neural network-based algorithms on processor-based platforms, in accordance with various embodiments of the present invention.

Figure 3:
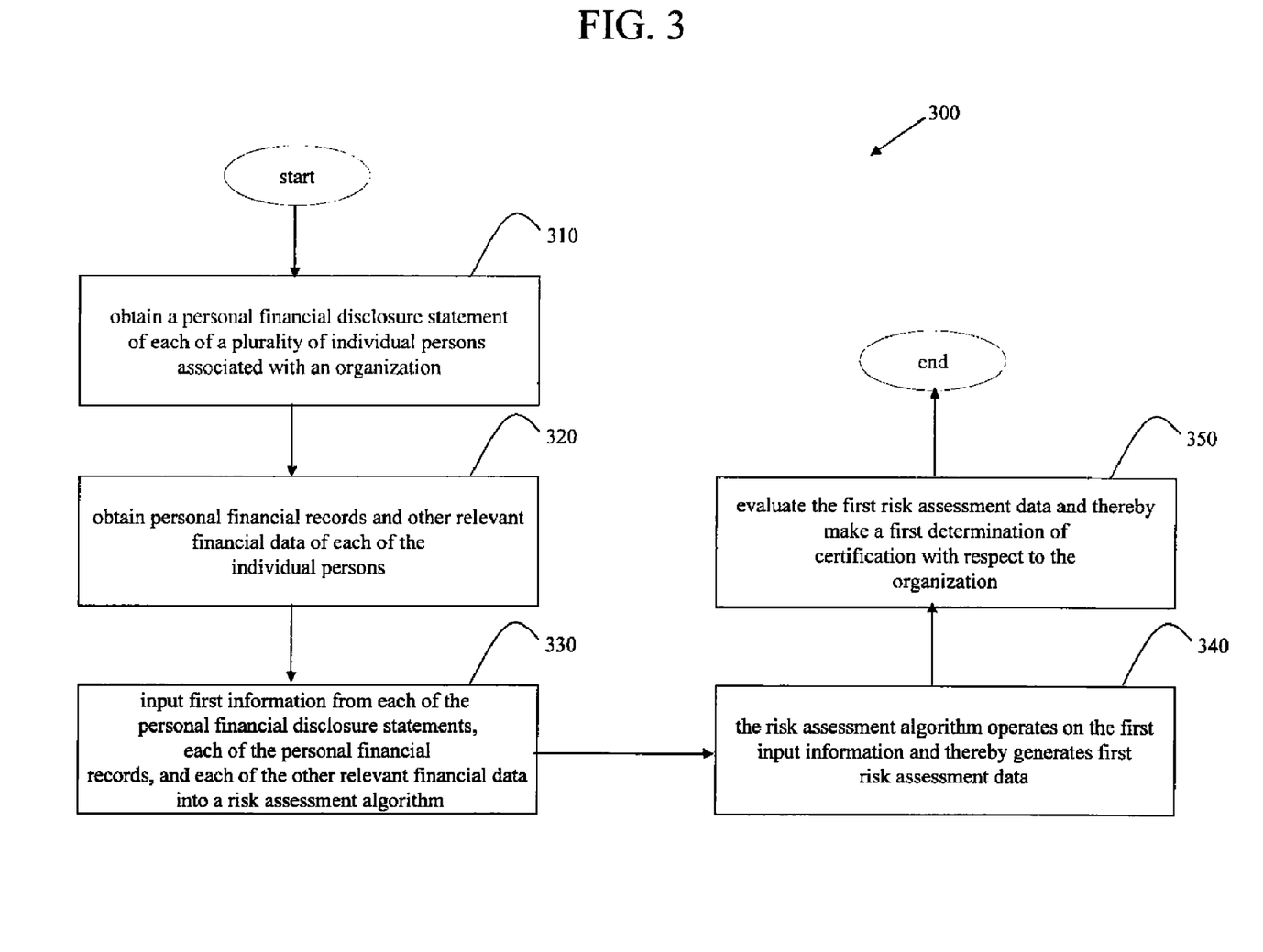
FIG. 3 illustrates a flowchart of a second embodiment of a method to monitor the behavior/activity of individuals associated with an organization using the cooperative arrangement of FIG. 1, in accordance with various aspects of the present invention.

Just as a single individual can be certified (and optionally underwritten) for risk of fraud and other improper behaviors, an entire organization may also be certified (and optionally underwritten), in accordance with an embodiment of the present invention. FIG. 3 illustrates a flowchart of a second embodiment of a method 300 which may be performed (conducted) to monitor the behavior/activity of an individual associated with an organization using the cooperative arrangement of FIG. 1, in accordance with various aspects of the present invention. In step 310, a personal financial disclosure statement of each of a plurality of individual persons associated with an organization is obtained. In step 320, personal financial records of each of the individual persons and other relevant financial data are obtained. In step 330, first information is extracted and input from each of the personal financial disclosure statements, each of the personal financial records, and each of the other relevant financial data into a risk assessment algorithm. In step 340, the risk assessment algorithm operates on the first input information and thereby generates first risk assessment data. In step 350, the first risk assessment data is evaluated and thereby a determination of certification is made with respect to the organization.

Therefore, by applying the cooperative arrangement 100 of FIG. 1 to all of the agents of an organization that handle or have direct or even indirect input to any of the certified financial statements of the organization, the entire organization may become certified, and optionally underwritten, for risk of fraud and other improper behaviors, for example. Just as for an individual agent, a composite risk factor may be generated for the entire organization and compared to a threshold value. The underwriting and/or investigative process illustrated in FIG. 1 may be followed with respect to the entire organization (e.g., a publicly held corporation), based on assessing the risk associated with a plurality of agents.

Alternatively, the method 200 of FIG. 2 may simply be repeated for each of the agents of the organization and, therefore, the organization becomes certified only after each of the agents is individually certified.

Figure 4:
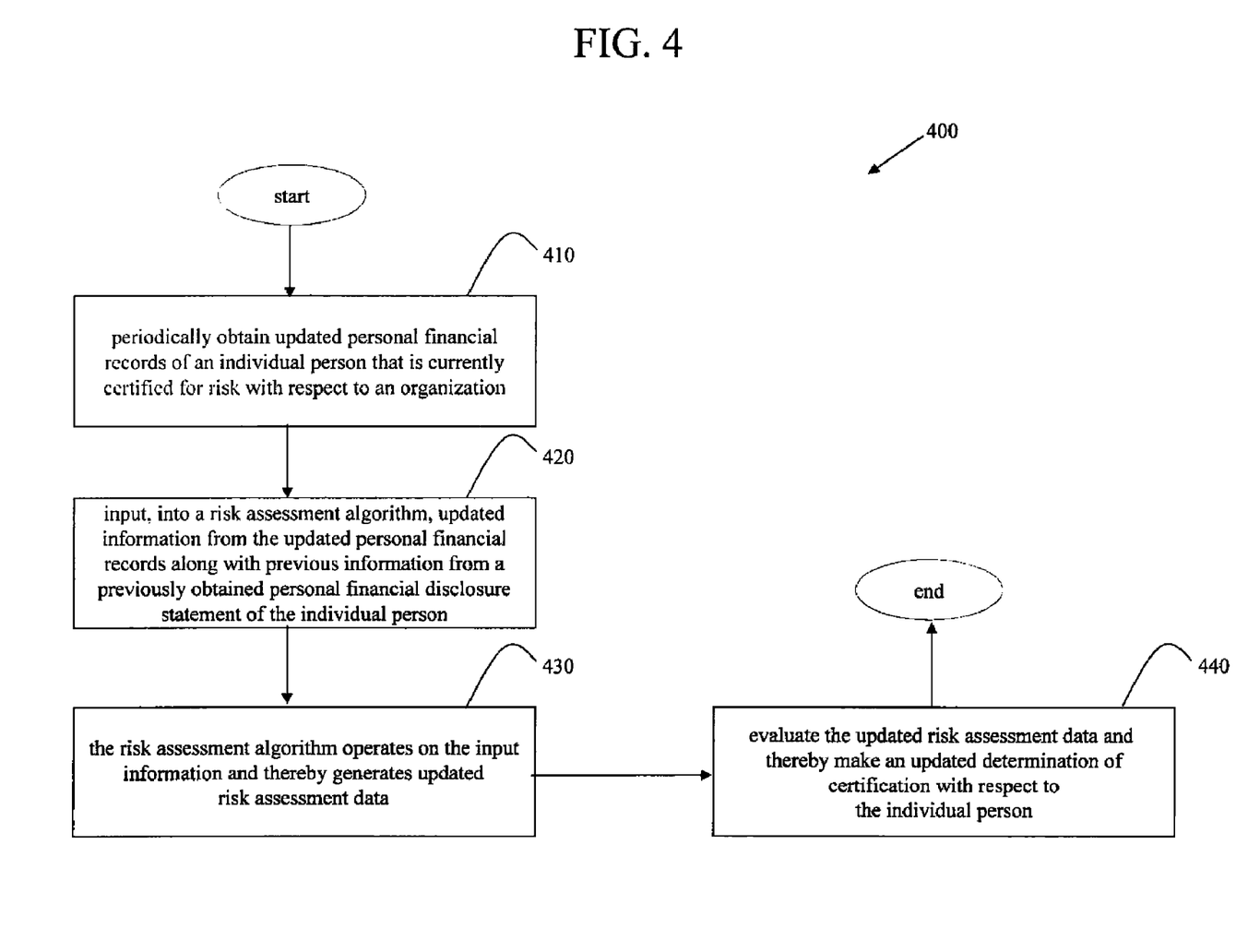
FIG. 4 illustrates a flowchart of an embodiment of a method to monitor an individual of an organization for risk using the cooperative arrangement of FIG. 1, in accordance with various aspects of the present invention.

FIG. 4 illustrates a flowchart of an embodiment of a method 400 which may be performed (conducted) to monitor an individual of an organization for risk using the cooperative arrangement of FIG. 1, in accordance with various aspects of the present invention. In step 410 updated personal financial records of an individual that is currently certified for risk with respect to an organization are periodically obtained. In step 420, updated information from the updated personal financial records and other relevant financial data is input into a risk assessment algorithm along with previous information from a previously obtained personal financial disclosure statement of the individual. In step 430, the risk assessment algorithm operates on the input information and thereby generates updated risk assessment data. In step 440, the updated risk assessment data is evaluated and an updated determination of certification is made with respect to the individual.

For example, an agent of an independent corporation who is currently certified and covered under the organization's insurance policy 190 may be required to allow updated (i.e., most-recent) personal financial records to be obtained by the certifying entity 105 every fiscal quarter, in accordance with the terms of the corresponding policy 190. As a result, the certifying entity 105 is able to effectively monitor the agent to see if any significant changes in his/her personal financial status has changed that could affect the agent's risk of committing fraud or other improper activities with respect to the independent corporation. Another agent of the independent corporation may be required to provide updated personal financial records only once a year, because of the agent's superior certification status (i.e., lower composite risk factor) and superior underwriting status.

In accordance with an alternative embodiment of the present invention, the financial status of an agent may be, effectively, continuously monitored. That is, as soon as updated financial information or data for an agent becomes available, the information is immediately input to the risk assessment algorithm and processed. The agent's financial behavior is effectively tracked.

If the agent's status changes from "certify" to "do not certify", then the investigative process previously described may be triggered and followed. As another example, if the agent's status remains "certify" but the agent's composite risk factor has changed (i.e., increased or decreased), the terms and conditions and/or premiums of the associated underwriting policy for the agent's company, if there is one, may be updated to reflect the changed risk. If no significant changes result, the previous certifying and underwriting status may be maintained.

In accordance with an alternative embodiment of the present invention, the agent may be required to provide an updated personal financial disclosure statement which is then also used in the monitoring process.

The method 400 of FIG. 4 also can also serve as a first indicator of identity theft for the monitored agent. Any unusual activity due to any form of identity theft may be detected by the certifying entity 105, or by the investigating entity 140. For example, if the agent's credit card number is stolen and used in such a way that would be considered unusual for the agent (e.g., sudden fluctuations in the account balance are seen), such an unauthorized use may be detected by the risk assessment algorithm 110.

Employees of the organization for which the agent works may be encouraged to report any observed misconduct on the part of the agent to persons in charge of the certifying entity 105. In this way, a reporting employee is reporting to an entity which may or may not be independent of his/her employer and, therefore, may be less reluctant to report such misconduct without fear of retaliation from the employer (i.e., from the organization for which the agent and the reporting employee are employed).

In accordance with an alternative embodiment of the present invention, there may be multiple levels or degrees of certification. For example, "gold", "silver", and "bronze" levels of certification may be defined based on ranges of possible numeric values that the composite risk factor can take on. As another example, levels of certification may be defined based on a number of years that an agent has been certified (e.g., 5-years certified, 10-years certified, etc.).

In accordance with a further alternative embodiment of the present invention, certification may be directed to particular positions within a company. For example, the composite risk factor requirement for a CEO may be different than that for a head of marketing. As another example, the exact risk assessment algorithm used may be somewhat different for a CEO than for a head of marketing.

In accordance with various embodiments of the present invention, certification may be mandatory or may be voluntary. For example, there may be an employee of an organization that is not required to be certified but would like to go through the certification process (possibly excluding the underwriting part of the process) in order to establish himself as an exemplary person of trustworthiness. Such a voluntary certification could help the employee gain a promotion into a position of higher responsibility, for example.

As another example, a private employer (i.e., not a publicly held company) may decide that all of his employees must become certified, in accordance with an embodiment of the present invention, in order to remain or become employed at his private company. That is, certification is a condition of employment. Such a mandatory prerequisite for employment can allow the private employer to hire and retain only those people that are trustworthy.

In summary, a cooperative arrangement and methods of helping to deter fraud and other improper activities within an organization are disclosed. Financial information is collected for at least one individual of the organization and fed into a risk assessment algorithm to determine a level of risk with respect to the individual. If the level of risk is acceptable, the individual may be certified and optionally underwritten in order to protect the organization against any losses incurred arising from improper conduct by the individual with respect to the organization.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method to monitor the personal behavior/activity of an individual associated with an organization, said method comprising:
   (a) obtaining a personal financial disclosure statement of an individual person associated with, or potentially to be associated with, said organization;
   (b) obtaining personal financial records and other relevant personal financial data of said individual person;
   (c) inputting first information from said personal financial disclosure statement, said personal financial records, and said other relevant personal financial data into a risk assessment algorithm implemented on a processor-based platform;
   (d) said risk assessment algorithm operating on said first input information within said processor-based platform and thereby generating first risk assessment data;
   (e) generating a composite risk factor in response to said first risk assessment data;

(f) comparing said composite risk factor to a threshold value; and (g) making a first determination of certification of said individual person, with respect to a likelihood to commit fraud, in response to said first risk assessment data.

2. The method of claim 1 further comprising certifying said individual person if said determination of certification is to certify.

3. The method of claim 2 further comprising underwriting said individual person if said determination of certification is to certify.

4. The method of claim 1 further comprising documenting reasons for not certifying said individual person if said determination of certification is not to certify.

5. The method of claim 4 further comprising investigating said reasons for not certifying said individual person and thereby generating investigative results.

6. The method of claim 5 further comprising inputting second information from said investigative results, said personal financial disclosure statement, said personal financial records, and said other relevant financial data into said risk assessment algorithm.

7. The method of claim 6 further comprising: said risk assessment algorithm operating on said second input information and thereby generating second risk assessment data; and making an updated determination of certification of said individual person, with respect to a likelihood to commit fraud, in response to said second risk assessment data.

8. The method of claim 1 wherein said individual person comprises an agent of said organization.

9. The method of claim 1 wherein said organization comprises a publicly held corporation.

10. The method of claim 1 wherein said organization comprises a non-publicly held corporation.

11. The method of claim 1 wherein said organization comprises a government entity.

12. The method of claim 1 wherein said personal financial records include at least one of tax return records, treasury records, real estate records, banking records, a credit report, and a FICO score.

13. The method of claim 1 wherein said personal financial disclosure statement includes information related to financial assets, liabilities, and income of said individual person.

14. The method of claim 3 wherein said underwriting includes insuring said organization by accepting liability for designated losses suffered by said organization arising from improper behavior by said individual person.

15. The method of claim 2 wherein said method is conducted by a first entity which is independent of said organization and said individual person.

16. The method of claim 4 wherein said method is conducted by a first entity which is independent of said organization and said individual person.

17. The method of claim 3 wherein said underwriting is conducted by
a second entity which is independent of said organization, said individual person, and a first entity conducting the steps (a) through (g) of claim 1.

18. The method of claim 5 wherein said investigating is conducted by
a third entity which is independent of said organization, said individual person, and a first entity conducting the steps (a) through (g) of claim 1.

19. The method of claim 1 wherein the step of said risk assessment algorithm operating on said first input information and thereby generating first risk assessment data comprises said risk assessment algorithm comparing information from said financial disclosure statement with information from said personal financial records and other relevant financial data and thereby detecting any discrepancies.

20. The method of claim 1 wherein the step of said risk assessment algorithm operating on said first input information and thereby generating first risk assessment data comprises said risk assessment algorithm detecting evidence of irresponsible behavior on the part of said individual person.

21. The method of claim 1 wherein the step of said risk assessment algorithm operating on said first input information and thereby generating first risk assessment data comprises said risk assessment algorithm generating an assessment of financial stability of said individual person.

22. The method of claim 1 wherein the step of obtaining personal financial records and other relevant financial data of said individual person is only performed if said individual person gives permission to perform said step.

23. The method of claim 1 wherein said determination of certification is to certify, if said composite risk factor is below said threshold value.

24. The method of claim 1 wherein said determination of certification is to not certify, if said composite risk factor is above said threshold value.

25. The method of claim 23 further comprising underwriting said individual person when said determination is to certify, said underwriting comprising adding said individual person to an insurance or bonding policy for said organization and possibly adjusting a premium or terms of said policy in response to at least said composite risk factor.

* * * * *